US012093837B2

(12) United States Patent
Zhou et al.

(10) Patent No.: US 12,093,837 B2
(45) Date of Patent: Sep. 17, 2024

(54) BUILDING A FEDERATED LEARNING FRAMEWORK

(71) Applicant: International Business Machines Corporation, Armonk, NY (US)

(72) Inventors: Yi Zhou, San Jose, CA (US); Rui Zhang, San Francisco, CA (US); Heiko H. Ludwig, San Francisco, CA (US); Jonathan F. Brunn, Logan, UT (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 16/536,711

(22) Filed: Aug. 9, 2019

(65) Prior Publication Data

US 2021/0042628 A1  Feb. 11, 2021

(51) Int. Cl.
G06N 3/10 (2006.01)
G06N 3/045 (2023.01)
G06N 3/08 (2023.01)

(52) U.S. Cl.
CPC ............. G06N 3/105 (2013.01); G06N 3/045 (2023.01); G06N 3/08 (2013.01)

(58) Field of Classification Search
CPC ......... G06N 3/105; G06N 3/0454; G06N 3/08
USPC .......................................................... 706/10
See application file for complete search history.

(56) References Cited

U.S. PATENT DOCUMENTS

| 8,291,474 | B2 | 10/2012 | Anderson et al. |
| 8,627,446 | B1 | 1/2014 | Eaton et al. |
| 9,405,634 | B1 | 8/2016 | Ambastha et al. |
| 9,524,217 | B1 | 12/2016 | Chockalingam et al. |

(Continued)

FOREIGN PATENT DOCUMENTS

| CN | 107871160 A | 4/2018 |
| CN | 109871702 A | 6/2019 |

(Continued)

OTHER PUBLICATIONS

Diaz-Montes, J., et al.; "Supporting Data-Intensive Workflows in Software-defined Federated Multi-Clouds", "IEEE Transactions n Cloud Computing", vol. 6, Issue 1, pp. 250-263, Jan.-Mar. 1, 2018.

(Continued)

Primary Examiner — Bradford F Wheaton
(74) Attorney, Agent, or Firm — Anthony R. Curro

(57) ABSTRACT

Embodiments relate to an intelligent computer platform to build a federated learning framework including creating a hierarchy of machine learning models (MLMs). The hierarchy of MLMs has a primary MLM in a primary layer. Training the primary MLM includes capturing contributing model updates across at least one communication channel. A secondary MLM is created and logically positioned in a secondary layer of the hierarchy. The secondary MLM is operatively coupled to the primary MLM across the at least one communication channel. The created secondary MLM is initialized, including cloning weights and framework of the primary MLM into the secondary MLM, and populated with secondary data. The populated data has model updates local to the created secondary MLM. The secondary MLM is logically stored local to the secondary layer, and limits access to the secondary MLM to the secondary layer.

17 Claims, 8 Drawing Sheets

(56) References Cited

U.S. PATENT DOCUMENTS

| | | |
|---|---|---|
| 10,049,340 B2 | 8/2018 | Notani et al. |
| 10,095,554 B2 | 10/2018 | Bequet et al. |
| 10,216,799 B2 | 2/2019 | Kumar et al. |
| 10,657,461 B2 | 5/2020 | McMahan |
| 2014/0337134 A1 | 11/2014 | Bugenhagen |
| 2016/0105346 A1 | 4/2016 | Pignataro et al. |
| 2016/0316016 A1 | 10/2016 | Arenas et al. |
| 2017/0005988 A1 | 1/2017 | Bansal et al. |
| 2018/0240011 A1* | 8/2018 | Tan ........................ G06N 3/084 |
| 2018/0329935 A1* | 11/2018 | Mugali ................... G06N 20/00 |
| 2019/0042937 A1 | 2/2019 | Sheller et al. |
| 2019/0209022 A1* | 7/2019 | Sobol ................... A61B 5/0022 |
| 2019/0213259 A1 | 7/2019 | Bacarella |
| 2019/0327271 A1* | 10/2019 | Saxena ............... H04L 41/0895 |
| 2020/0134423 A1* | 4/2020 | Shinde ................ G06F 11/0751 |
| 2020/0259717 A1* | 8/2020 | Ong ........................ G06N 20/00 |
| 2020/0327443 A1* | 10/2020 | Van Vredendaal .... G06N 20/00 |
| 2020/0409339 A1* | 12/2020 | Arashanipalai ....... G06F 16/906 |
| 2022/0230062 A1* | 7/2022 | Larsson ............... G06N 3/0445 |

FOREIGN PATENT DOCUMENTS

| | | |
|---|---|---|
| CN | 110019751 A | 7/2019 |
| CN | 112347754 A | 2/2021 |

OTHER PUBLICATIONS

Ammad-Ud-Din, M., et al.; "Federated Collaborative Filtering For Privacy-Preserving Personalized Recommendation System", Cornell University Library, pp. 1-12, Jan. 29, 2019.

McMahan, B., "Guarding User Privacy With Federated Learning and Differential Privacy", DIMACS Workshop on, pp. 1-70, Oct. 23-24, 2017.

Bonawitz et al.; "Towards Federated Learning at Scale: System Design", Proceedings of the 2nd SysML Conference on, pp. 1-15, Feb. 4, 2019.

Chen, F., et al., "Federated Meta-Learning for Recommendation", arXiv: 1802.07876v1, Feb. 22, 2018.

Zhao, Y., et al., "Federated Learning with Non-IID Data", arXiv:1806.00582v1, Jun. 2, 2018.

McMahan, B., et al., "Federated Learning: Collaborative Machine Learning without Centralized Training Data", Google AI Blog, Apr. 6, 2017.

CN First Office Action Dated Mar. 27, 2024—Application No. 202010764523.9, 12 pages.

* cited by examiner

BUILDING A FEDERATED LEARNING FRAMEWORK

BACKGROUND

The present embodiments relate to an artificial intelligence platform and an optimization methodology to create and support a federated learning framework. The framework represents a hierarchical layering of learning models, and the embodiments are directed to training and maintaining neural models within the hierarchy, and leveraging the models responsive to the hierarchy.

SUMMARY

The embodiments include a computer system, computer program product, and method for building and maintaining a federated learning framework.

In one aspect, a computer system is provided with a processor and memory for use with an artificial intelligence (AI) platform processing tools. The processor is operatively coupled to the memory and is in communication with the AI platform. The AI platform tools include a hierarchy manager, a training manager, and an MLM manager. The hierarchy manager functions to build a federated learning framework includes a hierarchy, and more specifically to create the hierarchy of machine learning models (MLMs). The hierarchy includes a primary MLM in a primary layer of the hierarchy. The hierarchy manager also functions to create a secondary MLM logically positioned in a secondary layer of the hierarchy. The secondary MLM is operatively coupled to the primary MLM across at least one communication channel. The training manager functions to train the primary MLM, which includes the capture of contributing model updates across at least one communication channel. The training manager functions to initialize the created secondary MLM, including cloning of weights and framework of the primary MLM into the secondary MLM, and populating the created secondary MLM with secondary data. The populated data includes model updates local to the created secondary MLM. The MLM manager functions to logically position the secondary MLM local to the secondary layer, limit access to the secondary MLM within the secondary layer, and logically position primary MLM data globally. The primary MLM is accessible to the secondary MLM.

In another aspect, a computer program device is provided to build a federated learning framework. The computer program product includes a computer readable storage medium having a program code embodied therewith. The program code is executable by a processor to build a federated learning framework, including program code to create a hierarchy of machine learning models (MLMs). The hierarchy of MLMs has a primary MLM logically positioned in a primary layer of the hierarchy. The program code trains the primary MLM, including capture contributing model updates across at least one communication channel. Also, the program code creates a secondary MLM logically positioned in a secondary layer of the hierarchy. The secondary MLM is operatively coupled to the primary MLM across the at least one communication channel. Moreover, the program code initializes the created secondary MLM, which includes the program code to clone weights and framework of the primary MLM into the secondary MLM, and populate the created secondary MLM with secondary data. The populated data includes model updates local to the created secondary MLM. Furthermore, the program code logically stores the secondary MLM local to the secondary layer, and limits access to the secondary MLM to a member of a secondary group local to the secondary layer. The program code logically stores the primary MLM globally and enables the primary MLM to be accessible to the secondary MLM.

In yet another aspect, a method is provided for building a federated learning framework, including creating a hierarchy of machine learning models (MLMs). The hierarchy of MLMs has a primary MLM logically positioned in a primary layer. Training the primary MLM includes capturing contributing model updates across at least one communication channel. A secondary MLM is created and logically positioned in a secondary layer of the hierarchy. The secondary MLM is operatively coupled to the primary MLM across the at least one communication channel. The created secondary MLM is initialized, including cloning weights and framework of the primary MLM into the secondary MLM, and populating the created secondary MLM with secondary data. The populated data is in the form of model updates local to the created secondary MLM. The secondary MLM is logically stored local to the secondary layer, and access to the secondary MLM is limited to the secondary layer.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
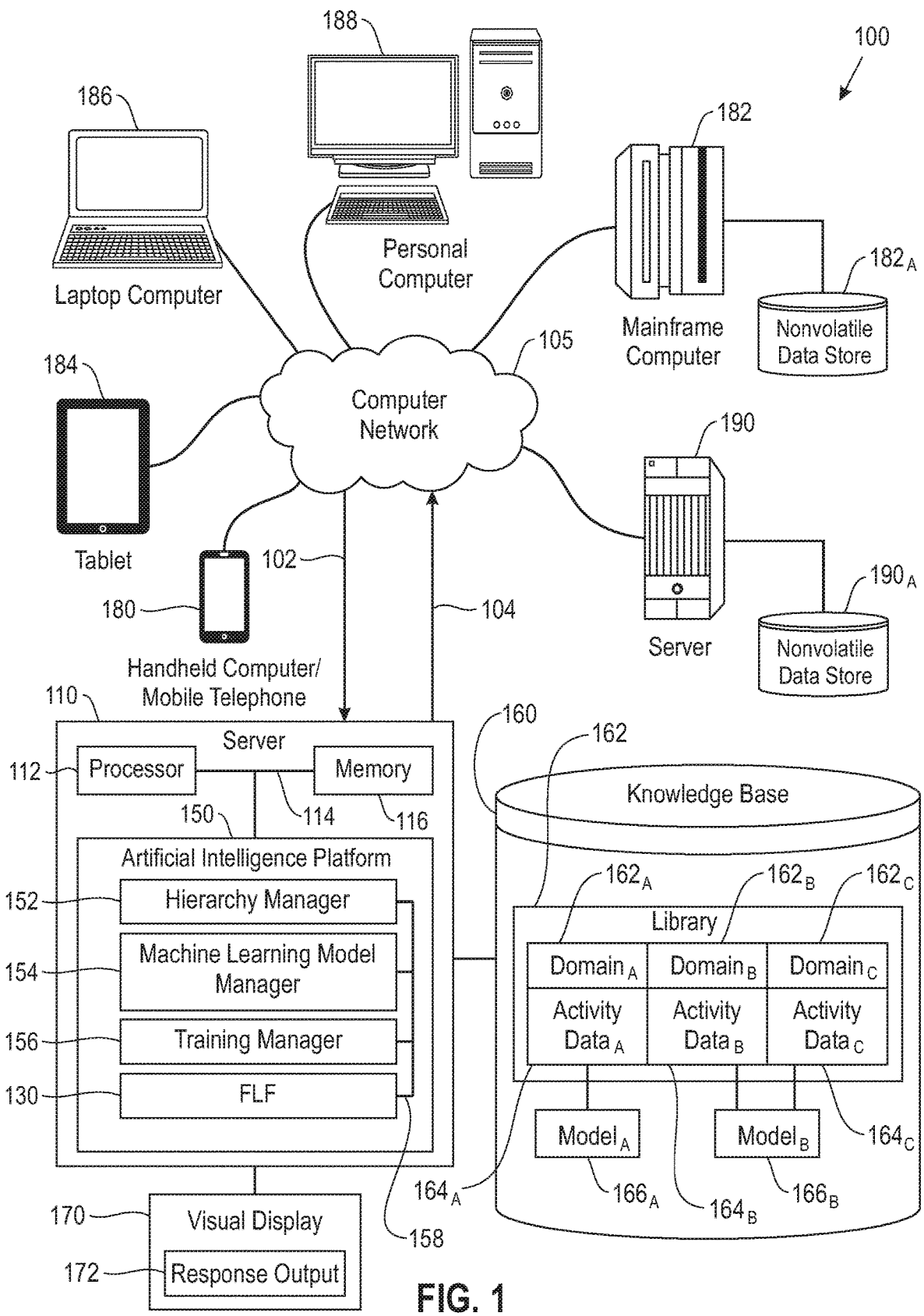
FIG. 1 depicts a system diagram illustrating a computer system.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. More specifically, ML is the application of AI through creation of neural networks that can demonstrate learning behavior by performing tasks that are not explicitly programmed. Deep learning is a type of ML in which systems can accomplish complex tasks. Deep learning is a method of ML that incorporates neural networks in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. Eventually, a result is delivered from the output layers. Deep learning complex neural networks are designed to emulate how the human brain works, so computers can be trained to support poorly defined abstractions and problems. Neural networks and deep learning are often used in image recognition, speech, and computer vision applications.

Regarding personalized local models, heterogeneity of the data from different groups, and immediate responses required in an online learning setting can impact the effectiveness of AI training. As an example, data heterogeneity can be the result of using different languages among groups or different conversation types. A large number of participants (clients/accounts) may subdivide into groups, e.g., different projects and languages. Thus, there may be an increase demand for particularized online learning and data privacy.

Privacy is the ability of an individual to determine what data can be shared, and employ access control. If the data is in the public domain, then it is a threat to individual privacy as the data is held by a data holder. Examples of a data holder can include a public or semi-public venue, such as, but not limited to, a social networking application, a website, a mobile app, an ecommerce site, a bank, and a hospital. Usually, it is the responsibility of the data holder to ensure privacy of a users' data. Apart from the data held in the public domain, knowing or unknowingly users themselves may contribute to data leakage. As an example, many mobile applications seek access to our contacts, files, and camera. Absent opting out of the terms and conditions, data leakage opportunities abound. There are various techniques that may be used to protect data privacy. These techniques include, but are not limited to, k-anonymity, l-diversity, t-closeness, randomization, data distribution, cryptographic methodologies, and multi-dimensional sensitivity based anonymization.

The system, method, and computer program product shown and described are provided and directed at a federated learning framework (FLF) with localization adapted to local group patterns. The FLF is shown herein with multiple MLMs organized into a hierarchy or hierarchical representation with layering and dependencies. A hierarchy is understood in the art as an inverted tree structure in which a plurality of items is grouped in the layering. An example of the hierarchy is shown and described in detail in FIG. 2. The FLF, as shown and described in detail below, includes a hierarchy of nodes and one or more corresponding MLMs. Nodes may be processors, communication controllers, cluster controllers, or terminals accessible by one or more clients. Clustering techniques can be utilized to form groups of a plurality of nodes and one or more corresponding MLMs, referred to herein as local MLMs. The local MLMs provide personalized local models directed at capturing local group pattern data and making decisions and predictions on a local basis, while a global model in the hierarchy captures general patterns across groups formed in the hierarchy. More specifically, the local model is directed at training at a local group level in the hierarchy and reacting on a local basis that does not require the same data quantity to a joined data set or a global model.

The embodiments herein can provide several advantages. Group performance may be enhanced by maintaining a local model and capture of local patterns where local behaviors can be emphasized. Generally, local models are maintained in a group or space level to mitigate the requirement of a large training dataset from client-ends and to reduce training time. The global model may be used to initialize the local model of a new formed group to ensure performance without a large amount of local training data. Often, the local models synchronize with the global model when the current local training dataset is insufficient. Local models can be exploited for identifying local patterns, making decisions, making predictions, reducing computation and data requirements for clients, and identifying the groups that the clients naturally formed to aid local pattern learning. As such, the computer system operates efficiently and effectively by providing a customized learning to a client. Moreover, it is possible to add privacy-preserving techniques to protect clients' data, such as differing privacy standards, tailored to a particular client. Thus, the embodiments herein can provide a privacy-preserving, personalized learning, and online learning in a collaborated learning framework.

Generally, the local model is based on local data or a grouping of local data, hereinafter referred to as a group. Typically, models are trained in an online fashion often with clients waiting on classification results due to limited budgets on training time. More training data can ensure performance, particularly when a large number of participants improve accuracy, such as under a differential privacy scheme. Defining local models associated with groups can obtain well-trained models in a limited training time.

Referring to FIG. 1, a schematic diagram of a computing system (100) is depicted. As shown, a server (110) is provided in communication via links (102) and (104) with a plurality of computing devices (180), (182), (184), (186), (188), and (190) across a computer network (105). The server (110) is configured with a processor (112) in communication with memory (116) across a bus (114). The server (110) is shown with an artificial intelligence (AI) platform (150) for cognitive computing, including natural language processing and machine learning, over the computer network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the computer network (105) enable communication detection, recognition, and resolution. Other embodiments of the server (110) may be used with components, systems, sub-systems, and/or devices other than those that are depicted herein.

The AI platform (150) is shown herein configured with tools to support configuration and management of a federated learning framework (FLF) with corresponding, and in one embodiment logically positioned, local and global neural models. The tools include, but are not limited to, a hierarchy manager (152), a machine learning model (MLM) manager (154), and a training manager (156). The AI platform (150) creates and manages the (FLF) (130) for logically organizing and positioning neural models in a hierarchy including at least one global or primary model and at least one local or secondary model, as shown and described in FIG. 2. The tools (152)-(156) are shown operatively coupled to the FLF (130) via at least one communication link (158).

The AI platform (150) may receive input from the computer network (105) and leverage a data source (160), also referred to herein as a corpus or knowledge base, to selectively access data. As shown the data source (160) is configured with a library (162) with a plurality of models that are created and managed by the hierarchy manager (152). Details of how the models are created are shown and described in detail below. It is understood that different domains, such as different groups or clients may each be classified as a domain. In the example shown herein, the domains include, but are not limited to, domain$_A$ (162$_A$), domain$_B$ (162$_B$), and domain$_C$ (162$_C$). Although only three domains are shown and represented herein, the quantity should not be considered limiting. In one embodiment, there may be a different quantity of domains. Similarly, domains may be added to the library (162). Corresponding activity data is stored or categorized with respect to each of the domains by the MLM manager (154). As shown, domain$_A$ (162$_A$) includes activity data$_A$ (164$_A$), domain$_B$ (162$_B$) includes activity data$_B$ (164$_B$), and domain$_C$ (162$_C$) includes activity data$_C$ (164$_C$).

It is understood that the supervised learning leverages data from a data source. As shown herein, the data source is referred to as the knowledge base (160) and is configured with domains and logically grouped activity data, also referred to herein as query response data, in the form of models. The MLM manager (154) functions to collect or extract data in the form of model updates from the various computing devices (180), (182), (184), (186), (188), and (190) in communication with the computer network (105). Once collected, the training manager (156) organizes or arranges the collected data from one or more of the computing devices into one or more of the corresponding models. More specifically, the training manager (156), train models via issuing queries to clients in the domain and collects client replies to the query. Models may be created based on an intra-domain activity or inter-domain activity. Two models are shown herein, although the quantity of models and their relationships to the domains should not be considered limiting. Model$_A$ (166$_A$) is shown operatively coupled to activity data (164$_A$), and is an intra-domain activity model. Model$_B$ (166$_B$) is shown operatively coupled to activity data$_B$ (164$_B$) and activity data$_C$ (164$_C$) and is an inter-domain activity model, also referred to herein as a multi-class classification model. As communications are detected, the activity data is updated, and each model configured and operatively coupled to the activity data is dynamically updated by the training manager (156).

The hierarchy manager (152) builds the FLF (130) and logically organizes the hierarchy (132) of machine learning models (MLM). In one embodiment, the MLMs are maintained in the library (162) and organized into the FLF (130). Typically, the hierarchy (132) contains layers of MLMs, with numbers of MLM layers increasing from the primary, to the secondary, to the tertiary, and henceforth.

The MLM manager (154) operatively and logically positions one or more secondary MLMs within the FLF (130) local to a secondary layer and limits access to the secondary MLM, as described in further detail hereinafter. Moreover, the MLM manger (154) may operatively position and configure the primary MLM globally, where the primary MLM is accessible to the secondary MLM. Additionally, the MLM manager (154) can synchronize the secondary MLM with the primary MLM, including to aggregate weight parameters under a secondary MLM setting, and update the primary MLM with aggregated local neural model weights included in the captured contribution data. Furthermore, the MLM manager (154) can logically position or form a new secondary MLM by using clustering techniques, as hereinafter described. Details of the logical positioning and clustering of MLMs within the hierarchy are shown and described in FIG. 4.

The training manager (156) trains the primary MLM, which includes issuing queries to one or more secondary MLMs or associated data sources, and collects replies or model updates, from one or more secondary MLMs or associated data sources. Moreover, the training manager (156) initializes a created secondary MLM, which as shown and described in detail below, includes cloning weights and framework of the primary MLM into the secondary MLM and populating the created secondary MLM with secondary data, the populated data including clients' replies to the queries local or operatively coupled to the created secondary MLM.

Response output (172) in the form of one or more of the derived actions, such as a sequence of actions or an amended sequence of actions, is communicated or otherwise transmitted to the processor (112) for execution. In one embodiment, the response output (172) is communicated to a corresponding network device, shown herein as a visual display (170), operatively coupled to the server (110) or in one embodiment, operatively coupled to one or more of the computing devices (180)-(190) across the computer network (105).

Figure 2:
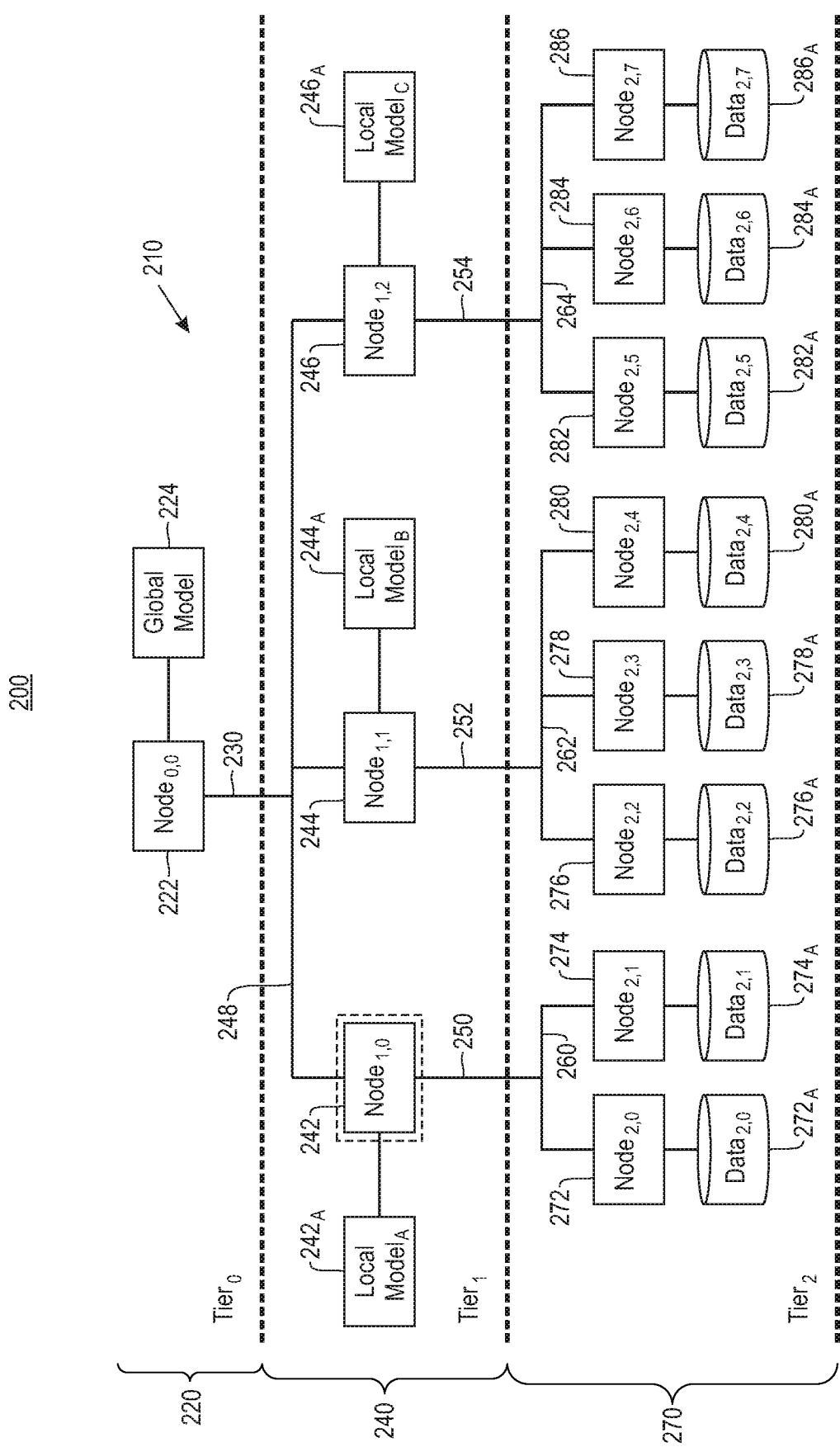
FIG. 2 depicts a block diagram illustrating an exemplary federated learning framework for the computer system, as shown and described in FIG. 1, and associated hierarchy of nodes.

Referring to FIG. 2, a block diagram (200) is provided illustrating a schematic representation of a federated learning framework (FLF). As shown, the FLF depicts a hierarchy (210) with multiple tiers, referred herein as layers, shown herein with three tiers referred to as $tier_0$ (220), $tier_1$ (240), and $tier_2$ (270). The hierarchy (210) represents a structure for organizing and relating a plurality of neural networks, including creating dependencies and gradients between the layers. As shown and described in the example, the hierarchy (210) is an inverted tree structure in which a plurality of items is associated in the layering. The hierarchy (210) is shown with multiple layers, e.g. three layers, although the quantity of layers should not be considered limiting. Although the hierarchy (210) may be considered a grouping, it should be understood in the context of the embodiments herein that grouping also occurs within individual layers. Each layer may have one or more items, referred to herein as nodes. As shown in this example, $tier_0$ (220) includes $node_{0,0}$ (222) operatively coupled with a model (224), hereinafter referred to as a global model. In one embodiment, $node_{0,0}$ (222) is referred to as the primary node or independent node. $Tier_1$ (240) is shown with three nodes, including $node_{1,0}$ (242) operatively coupled to a local or secondary $model_A$ ($242_A$), $node_{1,1}$ (244) operatively coupled to a local or secondary $model_B$ ($244_A$) and $node_{1,2}$ (246) operatively coupled to a local or secondary model ($246_A$). As hereinafter described, $node_{1,0}$ (242) may be a new formed node, as indicated by the dashed lines. $Node_{1,0}$ (242), $node_{1,1}$ (244), and $node_{1,2}$ (246) are referred to as dependent nodes based on their relationship to the $node_{0,0}$ (222). $Tier_2$ (270) is shown with eight nodes, including $node_{2,0}$ (272), $node_{2,1}$ (274), $node_{2,2}$ (276), $node_{2,3}$ (278), $node_{2,4}$ (280), $node_{2,5}$ (282), $node_{2,6}$ (284), and $node_{2,7}$ (286), which are referred to as dependent nodes directly dependent on $node_{1,0}$ (242), $node_{1,1}$ (244), and $node_{1,2}$ (246), and indirectly dependent on independent $node_{0,0}$ (222). $Node_{2,0}$ (272) operatively communicates with $data_{2,0}$ ($272_A$), $node_{2,1}$ (274) operatively communicates with $data_{2,1}$ ($274_A$), $node_{2,2}$ (276) operatively communicates with $data_{2,2}$ ($276_A$), $node_{2,3}$ (278) operatively communicates with $data_{2,3}$ ($278_A$), $node_{2,4}$ (280) operatively communicates with $data_{2,4}$ ($280_A$), $node_{2,5}$ (282) operatively communicates with $data_{2,5}$ ($282_A$), $node_{2,6}$ (284) operatively communicates with $data_{2,6}$ ($284_A$), and $node_{2,7}$ (286) operatively communicates with $data_{2,7}$ ($286_A$).

Communication channels are provided across the layers of the hierarchy. As shown, at least one communication channel (230) operatively couples primary $node_{0,0}$ (222) to dependent $node_{1,0}$ (242), dependent $node_{1,1}$ (244), and dependent $node_{1,2}$ (246). Local communication channels are provided to operatively couple nodes in $tier_{0,1}$ (240) with nodes in $layer_{0,2}$ (270). Local communication channel (250) operatively couples $node_{1,0}$ (242) with $node_{2,0}$ (272) and $node_{2,1}$ (274) via communication channel (260), local communication channel (252) operatively couples $node_{1,1}$ (244) with $node_{2,2}$ (276), $node_{2,3}$ (278), and $node_{2,4}$ (280) via communication channel (262), and local communication channel (254) operatively couples $node_{1,2}$ (246) with $node_{2,5}$ (282), $node_{2,6}$ (284), and $node_{2,7}$ (286) via communication channel (264).

Primary $node_{0,0}$ (222) captures contributing data from the nodes in the underlying tier, e.g. $tier_1$ (240). As shown, primary $node_{0,0}$ (222) is locally attached to global model (224), which can be any suitable MLM such as long short-term memory (LSTM). Dependent $node_{1,0}$ (242), dependent $node_{1,1}$ (244), and dependent $node_{1,2}$ (246) can independently include a group or secondary server operatively coupled to a local or secondary MLM, which can be any suitable MLM such as long short-term memory (LSTM). As shown herein, dependent $node_{1,0}$ (242) is in local communication with local $model_A$ ($242_A$), dependent $node_{1,1}$ (244) is in local communication with local $model_B$ ($244_A$), and dependent $node_{1,2}$ (246) is in local communication with local $model_C$ ($246_A$). Each of the local models shown in $tier_1$ (240) are based on data residing in $tier_2$ (270). In the example shown herein, local $model_A$ ($242_A$) is based on model updates received from $data_{2,0}$ ($272_A$) and $data_{2,1}$ ($274_A$), local $model_B$ ($244_A$) is based on model updates received from $data_{2,2}$ ($276_A$), $data_{2,3}$ ($278_A$), and $data_{2,4}$ ($280_A$), and local $model_C$ ($244_A$) is based on model updates received from $data_{2,5}$ ($282_A$), $data_{2,6}$ ($284_A$), and $data_{2,7}$ ($286_A$). Data communicated across the layers of the hierarchy, such as between $tier_1$ (240) and $tier_2$ (270) can be gradients or model parameters information allowing the training of local models at $tier_1$ (240). Gradients can be based on at least one client's local data and may occur when training a corresponding MLM as replies to queries are issued from $tier_1$ (240). In one embodiment, averaging all the gradients by a node in $tier_1$ (240) using a local group model can be applied. Also, the segregation of dependent $node_{1,0}$ (242), $node_{1,1}$ (244), and $node_{1,2}$ (246) can create a privacy differential, creating even more impetus for localized training. Accordingly, these features permit localization of nodes and compartmentalized learning for the hierarchy (210).

The primary $node_{0,0}$ (222) monitors the federated learning process. The functionality of the primary $node_{0,0}$ (222) includes issuing queries, collecting query responses, and aggregating collected responses to update the global model (224). In one embodiment, the primary $node_{0,0}$ (222) is referred to as an aggregator. Query responses are provided by clients, which in one embodiment are also referred to herein as participants or parties. The query responses are based on local data. For example, a query response provided by the client represented as $node_{2,1}$ (274) is based on local $data_{2,1}$ ($274_A$). A reply to the query is in the form of a model update communicated from the client, e.g. $node_{2,1}$ (274). The model update may be communicated to the global model (224) via local $model_A$ ($242_A$).

The MLMs of the hierarchy (210) can be stored in the knowledge base (160) and operatively coupled to the server (110). In one exemplary embodiment, the hierarchy (210) can be hosted on a single, central server accessed by only clients who are members of the FLF. Alternatively, a central server can maintain the global model (224) while a separate set of servers can be responsible for one or more groups of the local models, such as local server for the local $model_A$ ($242_A$) and a separate local server for the local $model_B$ ($244_A$) and local $model_C$ ($246_A$). In this version, maintenance and storage of local models is minimized.

The hierarchy shown and the associated quantity and structure of nodes and associated items represented in the hierarchy is merely an example and should not be considered limiting. The hierarchy (210) is directed at a structure to organize and categorize neural models, intended recipients, and associated content. As shown and described herein, content and associated atomic units may be classified or otherwise identified with permissive characteristics responsive to the hierarchical structure. By definition and illustration, assignment of one or more a permissive characteristics is not equivalent to organizing notification categories into a hierarchy. Similarly, use of the hierarchical structure does not necessitate the assignment of a priority to any content. Accordingly, the classification model is shown herein as a hierarchical structure with a representation of categories against which content and associated atomic units are processed.

As shown, the computer network (105) may include local network connections and remote connections in various embodiments, such that the AI platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the artificial intelligence platform (150) also including input interfaces to receive requests and respond accordingly.

The knowledge base (160) is configured with logically grouped domains ($162_A$)-($162_C$) and corresponding models ($164_A$)-($164_C$), respectively, for use by the AI platform (150). In one embodiment, the knowledge base (160) may be configured with other or additional sources of input, and as such, the sources of input shown and described herein should not be considered limiting. Similarly, in one embodiment, the knowledge base (160) includes structured, semi-structured, and/or unstructured content related to activities and tasks. The various computing devices (180)-(190) in communication with the computer network (105) may include access points for the logically grouped domains and models. Some of the computing devices may include devices for a database storing the corpus of data as the body of information used by the AI platform (150) to generate response output (172) and to communicate the response output to a corresponding network device, such as a visual display (170), operatively coupled to the server (110) or one or more of the computing devices (180)-(190) across the computer network (105).

The computer network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

The AI platform (150), via a network connection or an internet connection to the computer network (105), is configured to detect and manage network activity and task data as related to online learning. The AI platform (150) may effectively orchestrate or optimize an orchestrated sequence of actions directed at related activity data by leveraging the knowledge base (160), which in one embodiment may be operatively coupled to the server (110) across the computer network (105).

In some illustrative embodiments, the server (110) may be the IBM Watson® system available from International Business Machines Corporation of Armonk, New York, which is augmented with the mechanisms of the illustrative embodiments described hereafter. The managers (152)-(156), hereinafter referred to collectively as AI tools, are shown as being embodied in or integrated within the AI platform (150) of the server (110). The AI tools may be implemented in a separate computing system (e.g., 190), or in one embodiment they can be implemented in one or more systems connected across the computer network (105) to the server (110). Wherever embodied, the AI tools function to dynamically optimize activities to minimize, or otherwise mitigate, risk.

Types of devices and corresponding systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using the computer network (105). Types of the computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 3:
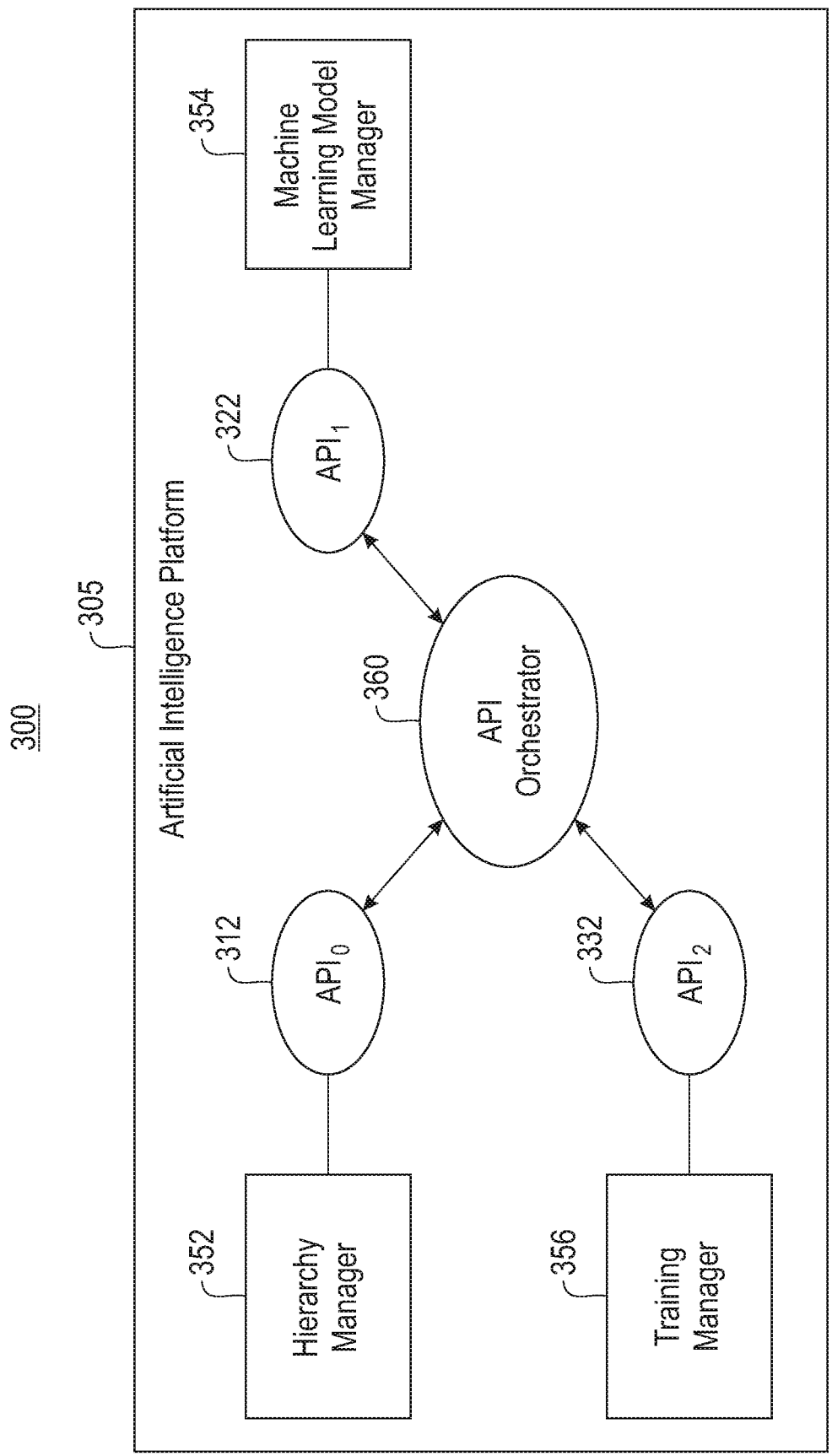
FIG. 3 depicts a block diagram illustrating the tools from the computing system and their associated Application Program Interface.

An Application Program Interface (API) is understood in the art as a software intermediary between two or more applications. With respect to the AI platform (150) shown and described in FIG. 1, one or more APIs may be utilized to support one or more of the tools (152)-(156) and their associated functionality. Referring to FIG. 3, a block diagram (300) is provided illustrating at least some of the tools (352)-(356) and their associated APIs. As shown, a plurality of tools is embedded within the AI platform (305), with the tools including the hierarchy manager (152) shown herein as (352) associated with $API_0$ (312), the MLM manager (154) shown herein as (354) associated with $API_1$ (322), and the training manager (156) shown herein as (356) associated with $API_2$ (332). Each of the APIs may be implemented in one or more languages and interface specifications. $API_0$ (312) provides functional support to collect and collate activity data across two or more domains; $API_1$ (322) provides functional support for the MLM corresponding to the collected and collated activity data; and API$_2$ (332) provides functional support to dynamically optimize, orchestrate, and update the models and corresponding groupings of the FLF. As shown, each of the APIs (312), (322), and (332) are operatively coupled to an API orchestrator (360), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

As shown and described herein, one or more local models are positioned within the FLF. In one embodiment, the local models may be representative of a group of nodes and corresponding data. For example, as shown in FIG. 2, local model$_B$ (244$_B$) represents a group formed from node$_{2,2}$ (276), node$_{2,3}$ (278), and node$_{2,4}$ (280). Groups can be created in the FLF by using a clustering technique. Similarly, created groups may be subject to an adjustment, which in one embodiment may include changing the membership of the group. Regarding clustering, there are different mechanisms for forming new groups. One mechanism is naturally forming new groups based on existing hierarchies. As an example, such groups can be formed by clients working on the same projects. Clustering techniques can also be applied to form a new group based on shared similar physical features, such as the language, assignments, titles, etc. A client can contribute to all local models of their member groups. Regarding group adjustment, new groups can be created by splitting an existing group or combining two or more groups. Before splitting, an analysis is undertaken to determine performance of an existing local model in predicting group behavior. An example of performance characteristics that may lend to splitting includes, but is not limited to, low prediction accuracy. Combining existing groups may be applicable for groups without enough training data. Accordingly, different techniques may be applied to form new groups in the FLF.

Figure 4:
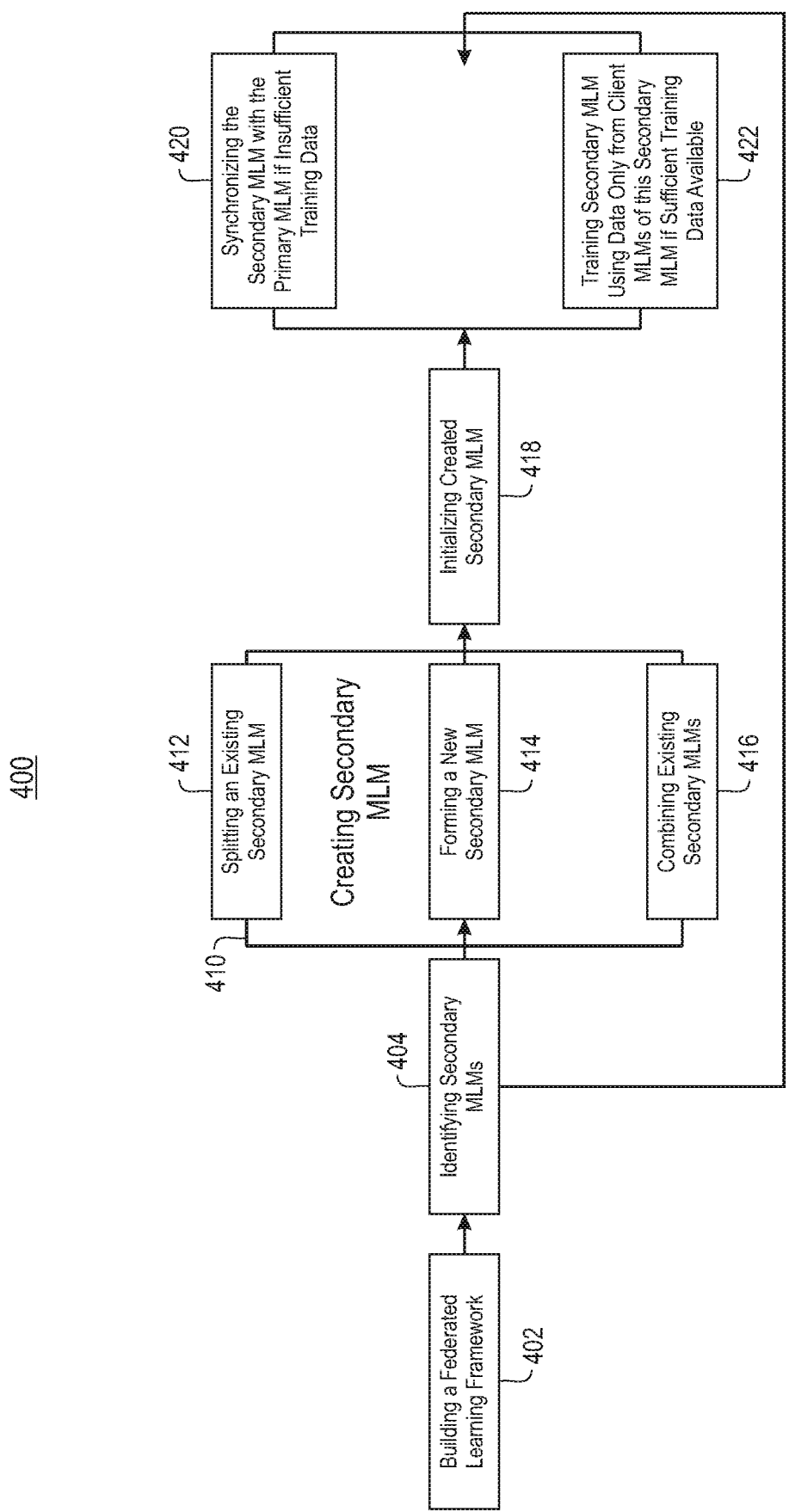
FIG. 4 depicts a flow chart illustrating the building of a federated learning framework and creating secondary MLMs.

Referring to FIG. 4, a flow chart (400) is provided to illustrate a process for creating a new secondary model in the FLF. As shown, a federated learning framework (FLF) is built or subject to a building process (402) with the functional support of the hierarchy manager (152). An example of the built FLF is shown and described in FIG. 2. The FLF is consulted and secondary models, e.g. local models, in the FLF are identified (404). New secondary models may be created, synchronized, or trained (410). Creating new secondary models takes place by splitting an existing secondary model (412), forming a new secondary model (414), or combining two or more existing secondary models (416). There are several methods to combine information from different secondary models. Weighted average based on confidence of each group associated with the model by scoring and measuring accuracy can be determined. Typically, the model is trained and compared to predictions. If sufficiently correlated, the groups or secondary models can be combined. Alternatively, a prediction is made by the closest group. Typically a group is used with highest closeness score and serves as a model that better predicts behavior by having a closer delta score on an active channel. After creation of a new secondary model (410) at one or more of steps (412), (414), or (416), the created new secondary model is subject to an initialization process (420) using the global model and corresponding weights, and applying the framework and weights of the global model to the created secondary model(s). Accordingly, one or more secondary models are created and initialized.

Following either step (404) or step (410), existing secondary models are subject to synchronizing or training. As shown, the created secondary model (410) is subject to being initialized (418), including either synchronized (420) with the primary model, e.g. global model, if insufficient training data is available, or subject to training based on model updates only from the clients belonging to the created secondary group if sufficient training data is available (422). In an embodiment, the global model is used to make decisions or predictions until the secondary model has enough training data to capture local patterns. Accordingly, the secondary MLMs are operatively related to and synchronized with the global model.

Figure 5:
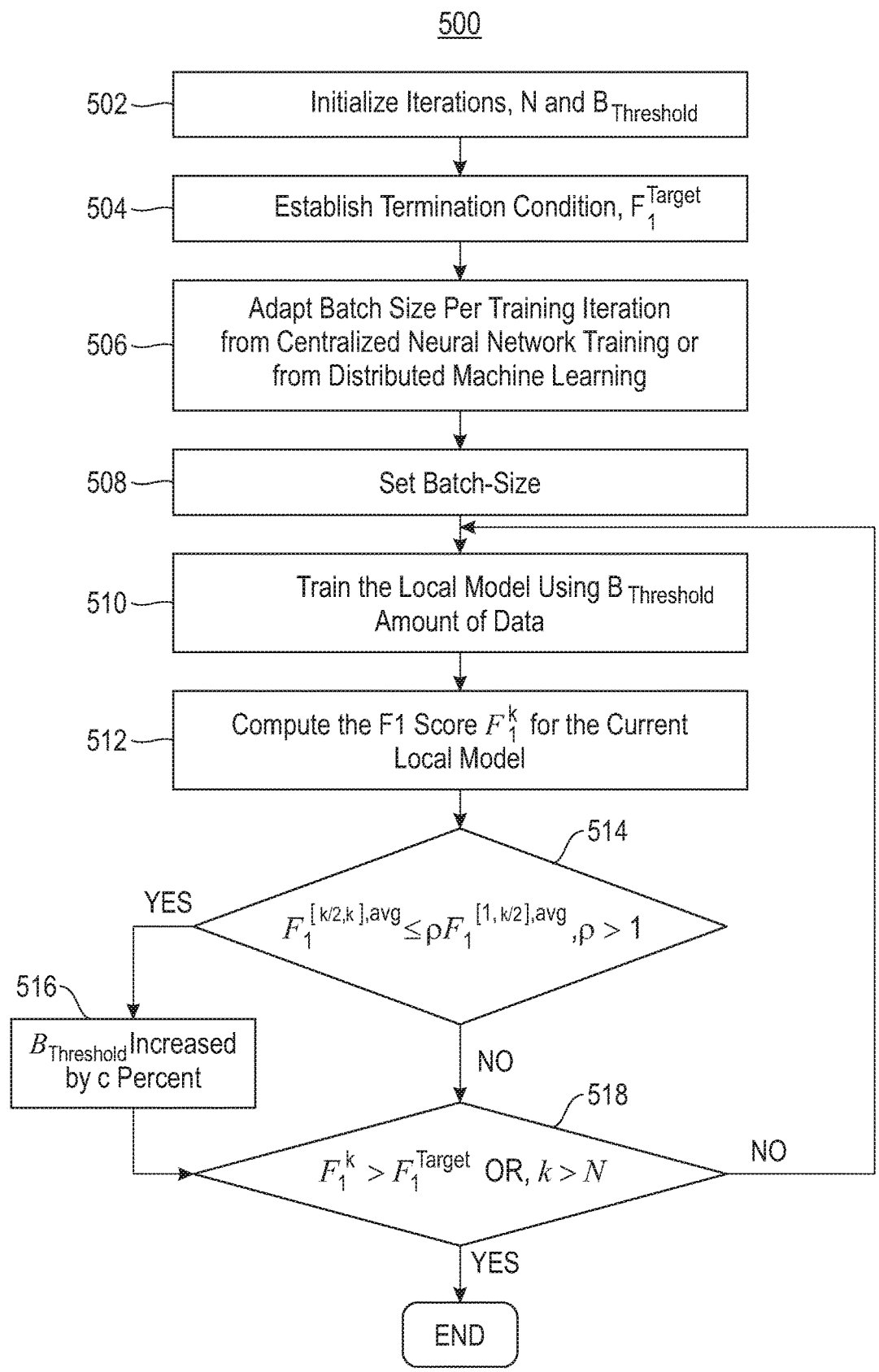
FIG. 5 depicts a flow chart illustrating training a local model by first determining the sufficiency of training data.

Referring to FIG. 5, a flow chart (500) is provided to illustrate a process for controlled training on a secondary model. As shown and described above, the framework and weights of the global model is used to create or establish an initial framework for the secondary model, and the secondary model is trained based on local clients data in a federated learning fashion. Prior to training the secondary model, the number of iterations, N, and a threshold value of data to calculate model updates as responses to training queries of the secondary model, B$_{threshold}$, (502) is initialized or otherwise established. In one embodiment, until the secondary model has met the threshold value, the global model or a different secondary model will be utilized. A termination condition, F$_1^{target}$, is established as a metric to evaluate performance of the model (504), a batch-size per training iteration adapted from centralized neural network training (506) or from distributed machine learning is set (508). A framework of the model begins with controlled training conducted on a local model using the threshold data amount, e.g. B$_{threshold}$, (510). An F$_1$ score is a metric to evaluate performance of the model. The F$_1$ score F$_1^k$ is computed for the current secondary model (512). Following the computation at step (512), it is determined if the performance metric of the model has a sufficient improvement over a previous averaging performance. In one embodiment, the determination at step (514) is mathematically represented as the following:

$$F_1^{[\frac{k}{2},k],avg} \leq \rho F_1^{[1,\frac{k}{2}],avg}$$

where $\rho$ is an accuracy improvement factor and $\rho>1$ is a given constant, k is a current iteration, F$_1^k$ is a F$_1$ score for the local model at iteration k, which ranges from 0 to 1, and F$_1^{[k/2,k],avg}$ is an average F$_1$ score of iteration k/2 to iteration k. A positive response to the determination at step (514) is indicated by an increase of B$_{threshold}$ by c percent (516). However, a negative response to the determination at step (514) or following the increase at step (516) is followed by a determination to assess if the performance metric of the secondary model exceeds the target performance metric (518). In one embodiment, the determination at step (518) is mathematically represented as the following:

$$F_1^k > F_1^{target} \text{ OR, } k > N$$

where F$_1^{target}$ is a target F$_1$ score and N is an iteration limit. A negative response to the determination at step (518) is followed by a return to step (510), and a positive response concludes the training of the secondary model. Accordingly, as shown herein the secondary model is subject to training based on a threshold quantity of data and a target performance metric.

Embodiments shown and described herein may be in the form of a computer system for use with an intelligent computer platform for providing orchestration of activities across one or more domains to minimize risk. Aspects of the tools (152)-(156) and their associated functionality may be embodied in a computer system/server in a single location, or in one embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the system, tools, and processes described above with respect to FIGS. 1-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
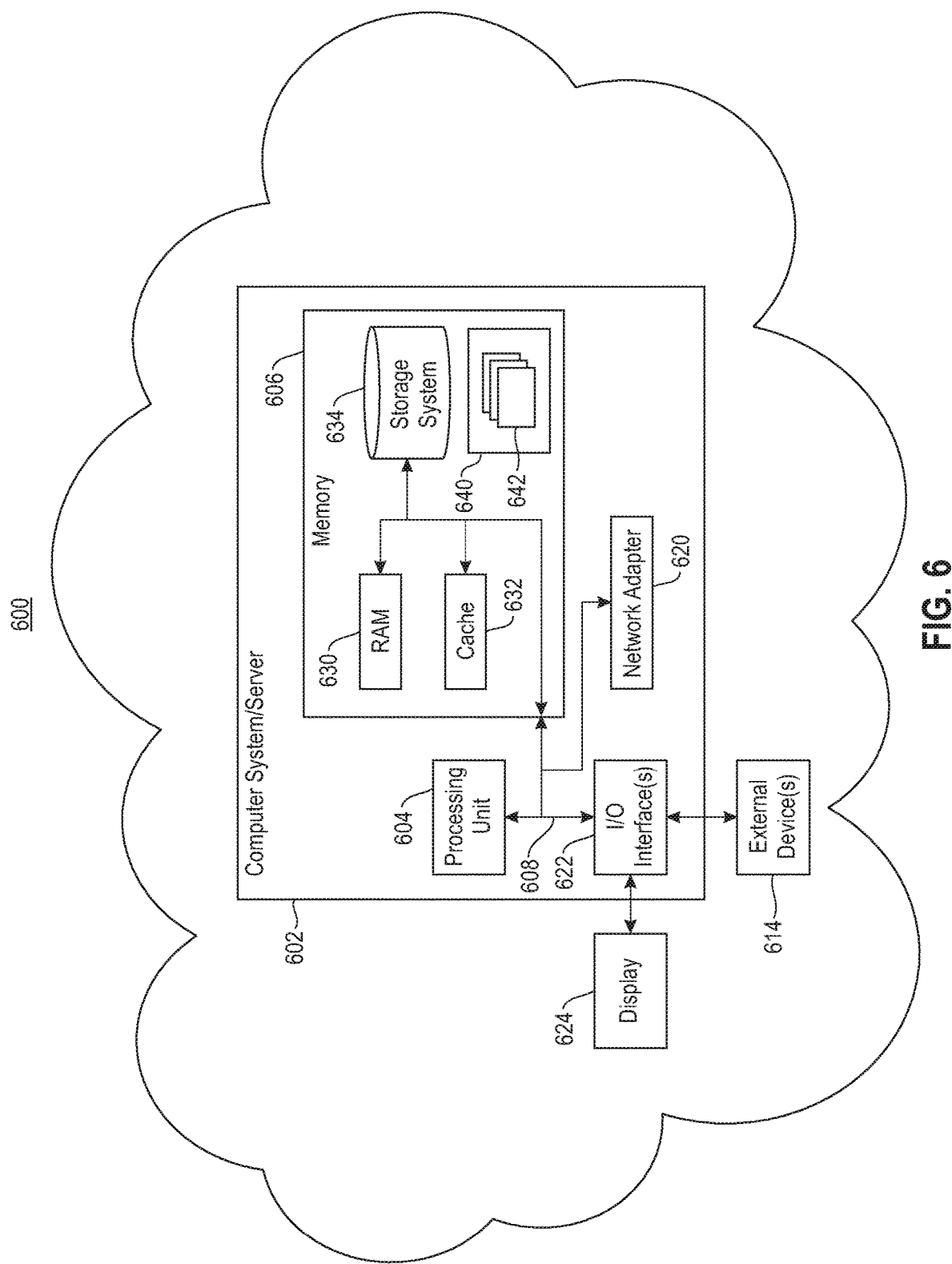
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device such as a computer system and/or server. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to dynamically orchestrate of activities across one or more domains to minimize risk. For example, the set of program modules (642) may include the tools (152)-(156) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk®, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
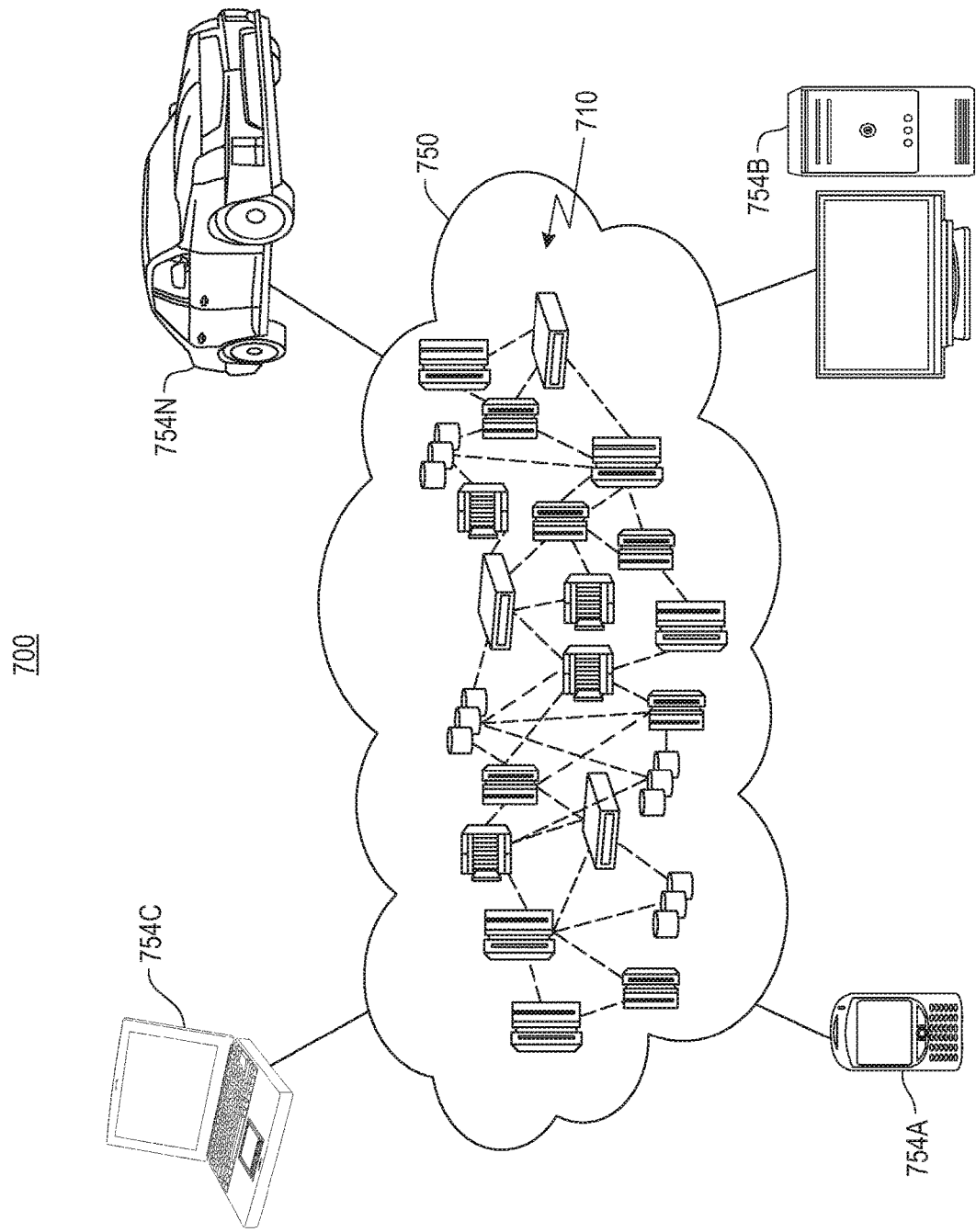
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
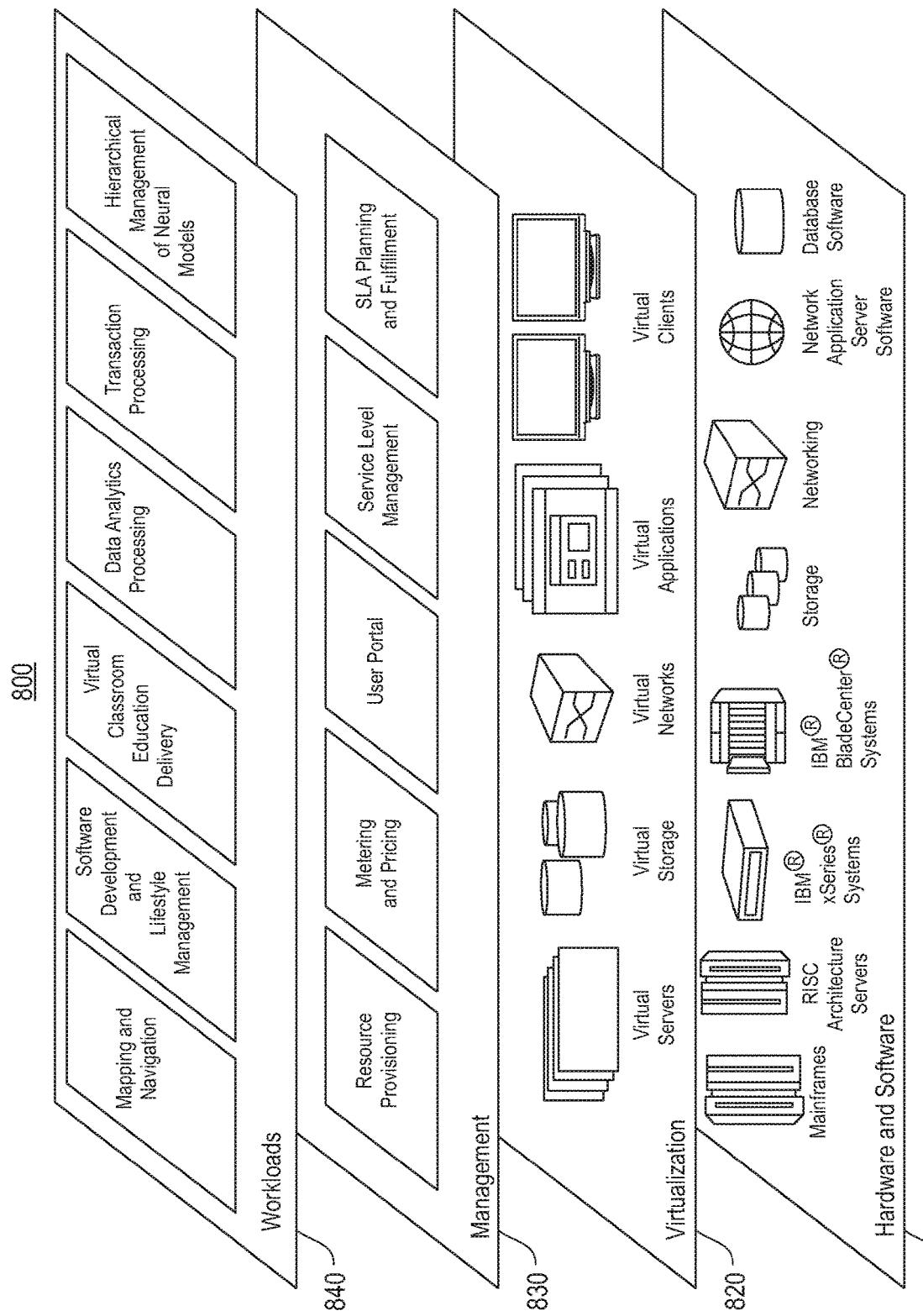
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and hierarchy management of neural models.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to build a federated learning framework.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In one embodiment, the FLF is a logical hierarchy of models operatively coupled across the layers. Accordingly, the scope of protection of the embodiments is limited only by the following claims and their equivalents.

What is claimed is:

1. A computer system comprising:
    a processor operatively coupled to a memory;
    an artificial intelligence (AI) platform, in communication with the processor, having tools configured to build a federated learning framework, comprising:
        a training manager configured to train the primary machine learning model (MLM), including to capture contributing model updates to train the primary MLM, the contributing model updates transmitted across at least one communication channel;
        the hierarchy manager configured to create a secondary MLM logically positioned in a secondary layer of the hierarchy, the secondary MLM operatively coupled to the primary MLM across the at least one communication channel;
        the training manager configured to initialize the created secondary MLM, including clone weights and framework of the primary MLM into the secondary MLM, and populate the created secondary MLM with secondary data, the populated data comprising model updates local to the created secondary MLM;
        a MLM manager configured to logically position the secondary MLM local to the secondary layer, and limit access to the secondary MLM within the secondary layer;
        the MLM manager configured to store primary MLM data globally, wherein the primary MLM 1s accessible to the secondary MLM;
        the MLM manager further configured to manage the federated learning framework, including selectively apply a clustering technique to the MLMs based on one or more attribute of the federated learning framework and to manage membership of one or more of the MLMs within one or more formed clusters of MLMs;
        the MLM manager further configured to synchronize the secondary MLM with the primary MLM, including to aggregate weight parameters under a secondary MLM setting, and to update the primary MLM with aggregated local neural network model weights included in the captured contributing data from the secondary MLM;
        the training manager is supported by a first API that provides functional support to dynamically optimize, orchestrate, and update the models of the federated learning framework;

the hierarchy manager is supported by a different second API that provides functional support to collect and collate activity data across two or more domains;

the MLM manager is supported by a different third API that provides function support for MLMs corresponding to collecting and collating activity data; and where each of the first API, the second API, and the third API are operatively coupled together to an API orchestrator to transparently thread together the separate APIs.

2. The system of claim 1, further comprising the MLM manager configured to apply the clustering technique to two or more MLMs within the secondary layer, the applied clustering technique to form a new cluster of MLMs or split an existing cluster of two or more MLMs.

3. The system of claim 2, wherein the application of the clustering technique within the secondary layer further comprises the MLM manager configured to split the secondary MLM, the split to form at least one new secondary MLM, and further configured to train the at least one new secondary MLM.

4. The system of claim 2, wherein application of the clustering technique further comprises the MLM manager to combine two or more existing secondary MLMs into a merged secondary MLM.

5. The system of claim 1, further comprising the training manager configured to update the secondary MLM using model updates local to that secondary MLM.

6. A computer program product to build a federated learning framework, the computer program product comprising:
  a computer readable storage medium having a program code embodied therewith, the program code executable by a processor to:
    build a hierarchy of machine learning models (MLMs) and integrate federated learning into the hierarchy, wherein the hierarchy of MLMs comprises a primary MLM in a primary layer of the hierarchy;
    train, with a training manager, the primary MLM, including capture contributing model updates to train the primary MLM, the contributing model updates transmitted across at least one communication channel:
    create, with a hierarchy manager, a secondary MLM in a secondary layer of the hierarchy, the secondary MLM logically coupled to the primary MLM across the at least one communication channel:
    initialize, with the training manager the created secondary MLM, including clone weights and framework of the primary MLM into the secondary MLM, and populate the created secondary MLM with secondary data, the populated data comprising model updates local to the created secondary MLM;
    store, with a MLM manager, the secondary MLM local to the secondary layer, and limit access to the secondary MLM to a member of a secondary group local to the secondary layer;
    store, with the MLM manager, the primary MLM globally, wherein the primary MLM data is accessible to the secondary MLM;
    manage, with the MLM manager, the federated learning framework, including selectively apply a clustering technique to the MLMs based on one or more attributes of the federated learning framework and to manage membership of one or more of the MLMs within one or more formed clusters of MLMs;
    synchronize, with the MLM manager, the secondary MLM with the primary MLM, including to aggregate weight parameters under a secondary MLM setting, and to update the primary MLM with aggregated local neural network model weights included in the captured contributing data from the secondary MLM;
    the training manager that is supported by a first API that provides functional support to dynamically optimize, orchestrate, and update the models of the federated learning framework;
    the hierarchy manager the is supported by a different second API that provides functional support to collect and collate activity data across two or more domains;
    the MLM manager that is supported by a different third API that provides function support for MLMs corresponding to collecting and collating activity data; and
    where each of the first API, the second API, and the third API are operatively coupled together to an API orchestrator to transparently thread together the separate APIs.

7. The computer program product of claim 6, further comprising program code executable by the processor to apply the clustering technique to two or more MLMs within the secondary layer, the applied clustering technique to form a new cluster of MLMs or split an existing cluster of two or more MLMs.

8. The computer program product of claim 7, wherein application of the clustering technique within the secondary layer further comprises program code executable by the processor to split the secondary MLM and train the formed new secondary MLM.

9. The computer program product of claim 7, wherein application of the clustering technique further comprises program code executable by the processor to combine two or more existing secondary MLMs into a merged secondary MLM.

10. The computer program product of claim 6, further comprising program code executable by the processor to update the secondary MLM using model updates local to that secondary MLM.

11. A method, comprising:
  building a federated learning framework, including a hierarchy of machine learning models (MLMs) and integrating federated learning into the hierarchy, wherein the hierarchy of MLMs comprises a primary MLM in a primary layer of the hierarchy;
  a training manager training the primary MLM, including capturing contributing model updates to train the primary MLM, the contributing model updates transmitted across at least one communication channel:
  a hierarchy manager creating a secondary MLM in a secondary layer of the hierarchy, the secondary MLM operatively coupled to the primary MLM across the at least one communication channel;
  a training manager initializing the created secondary MLM, including cloning weights and framework of the primary MLM into the secondary MLM, and populating the created secondary MLM with secondary data, the populated data comprising model updates local to the created secondary MLM;

a MLM manager storing the secondary MLM local to the secondary layer, and limiting access to the secondary MLM to the secondary layer;

the MLM manager managing the federated learning framework, including selectively applying a clustering technique to the MLMs based on one or more attributes of the federated learning framework and managing membership of one or more MLMs within one or more formed clusters of MLMs;

the MLM manager synchronizing the secondary MLM with the primary MLM, including to aggregate weight parameters under a secondary MLM setting, and to update the primary MLM with aggregated local neural network model weights included in the captured contributing data from the secondary MLM;

the training manager that is supported by a first API that provides functional support to dynamically optimize, orchestrate, and update the models of the federated learning framework;

the hierarchy manager the is supported by a different second API that provides functional support to collect and collate activity data across two or more domains;

the MLM manager that is supported by a different third API that provides function support for MLMs corresponding to collecting and collating activity data; and where each of the first API, the second API, and the third API are operatively coupled together to an API orchestrator to transparently thread together the separate APIs.

12. The method of claim 11, further comprising applying the clustering technique to two or more MLMs within the secondary layer, the applied clustering technique forming a new cluster of MLMs or splitting an existing cluster of two or more MLMs.

13. The method of claim 12, wherein applying the clustering technique within the secondary layer further comprises splitting the secondary MLM and training the newly formed secondary MLM.

14. The method of claim 12, wherein applying the clustering technique further comprises combining two or more existing secondary MLMs into a merged secondary MLM.

15. The method of claim 12, further comprising storing the primary MLM data globally, wherein the primary MLM is accessible to the secondary MLM.

16. The method of claim 12, further comprising updating the secondary MLM using model updates local to that secondary MLM.

17. The method of claim 11, wherein the one or more attributes of the federated learning framework comprises one or more physical features, one or more performance characteristics, or a combination thereof.

\* \* \* \* \*